United States Patent [19]

Basham

[11] 3,889,134

[45] June 10, 1975

[54] TUNNEL DIODE DIGITAL DATA SAMPLE, DECISION AND HOLD CIRCUIT

[75] Inventor: Jack K. Basham, Los Angeles, Calif.

[73] Assignee: TRW Inc., Redondo Beach, Calif.

[22] Filed: May 16, 1974

[21] Appl. No.: 470,691

[52] U.S. Cl. ................ 307/268; 307/286; 307/322; 307/323; 328/151

[51] Int. Cl. ......................... H03k 5/01; H03k 19/10

[58] Field of Search ........... 307/260, 268, 286, 322, 307/323; 328/151

[56] References Cited

UNITED STATES PATENTS

| | | | |
|---|---|---|---|
| 3,510,679 | 5/1970 | Peil | 307/322 X |
| 3,603,818 | 9/1971 | White | 307/322 X |

*Primary Examiner*—Siegfried H. Grimm

*Attorney, Agent, or Firm*—Daniel T. Anderson; Edwin A. Oser; Jerry A. Dinardo

[57] ABSTRACT

A high speed circuit for sampling and reconstructing a nonreturn to zero data input. The circuit essentially consists of a Goto pair, that is of a matched pair of tunnel diodes biased in such a way that one of them will switch to the injection region upon the arrival of both the digital data and a clock signal. The Goto pair is connected to a back diode which will become conductive when one of the Goto pair switches. The Goto pair will provide a return to zero signal which is changed again by a memory circuit to a nonreturn to zero signal. The memory circuit follows the back diode and includes an additional tunnel diode loaded for bistable operation.

10 Claims, 10 Drawing Figures

TUNNEL DIODE DIGITAL DATA SAMPLE, DECISION AND HOLD CIRCUIT

BACKGROUND OF THE INVENTION

This invention relates generally to high speed digital data transmission systems and particularly relates to a data sampling, decision and hold circuit for such a system.

In the past various high speed digital data transmission systems have been devised. The currently required data rates are in the range of 100 megabits per second up to 1 gigabit per second. After the digital data has been recovered from a carrier or the like it is generally sampled and reconstructed. Due to the high data rates required, extremely wideband circuits have been found to be necessary.

This has been accomplished in the past by a sampling gate circuit followed by a decision and hold circuit. This design approach is accompanied by a large insertion loss of the sampling gate. As a result wideband drivers are required which are expensive because they require many elements and also have a high direct current power requirement. Sampling gate noise is also a serious problem which degrades system performance.

It is accordingly an object of the present invention to provide such a combination sample, decision and hold circuit which requires a minimum number of parts and has a low power consumption.

Another object of the invention is to provide a decision circuit of the type referred to which will store the incoming data in a nonreturn to zero format.

A further object of the present invention is to provide such a circuit which is capable of storbing the incoming data by means of a clock pulse recovered from the incoming data stream to obtain data output with a minimum of error, thus obviating the requirement for a separate sampling gate with its attendant problems.

SUMMARY OF THE INVENTION

A high speed sample, decision and hold circuit for sampling and reconstructing a nonreturn to zero data input is provided in accordance with the present invention. The circuit basically includes a pair of matched tunnel diodes or Goto pair and means for biasing them and balancing the two diodes so that one of the diodes will change state in response to the data input in conjunction with a clock signal.

A Goto pair or locked twin diodes has been described by E. Goto et al. "Esaki Diode High Speed Logical Circuits," IRE Transactions on Electronic Computers, 1960, pages 25 – 29. Basically, a Goto pair consists of two matched tunnel diodes properly biased. Reference is also made to a paper by Gibson which appears in RCA Review, December 1962, p. 457 – 488 entitled "An Analysis of the Effects of Reactances on the Performance of the Tunnel-Diode Balanced-Pair Logic Circuit."

The clock signal is applied to the anode of the first diode and the cathode of the second diode while the cathode of the first diode is directly connected to the anode of the second diode. Coupling means including a unilaterally conducting device is connected to the junction point of the two tunnel diodes. This may, for example, consist of a back diode.

This coupling circuit is then followed by a memory circuit coupled to the back diode for generating an output signal again in the form of a nonreturn to zero data.

The memory circuit includes further bistable tunnel diode for storing the output data.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
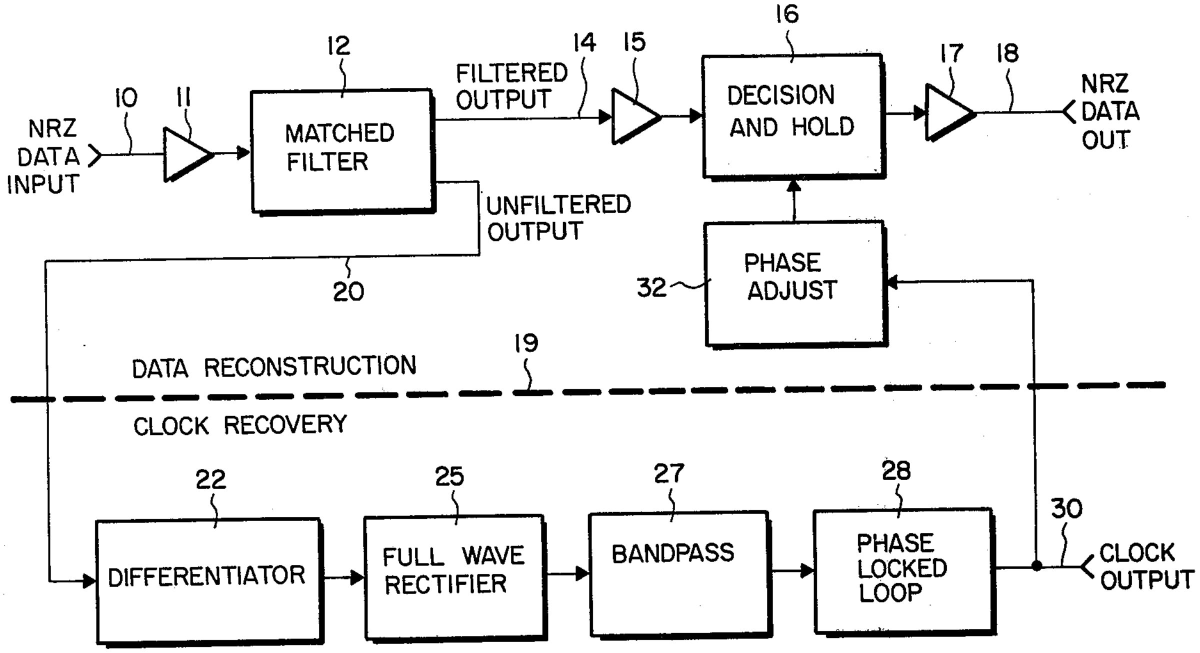
FIG. 1 is a block diagram of a typical bit synchronizer including the decision and hold circuit of the invention and having a portion for the data reconstruction and another portion for the clock recovery.
Figure 2:
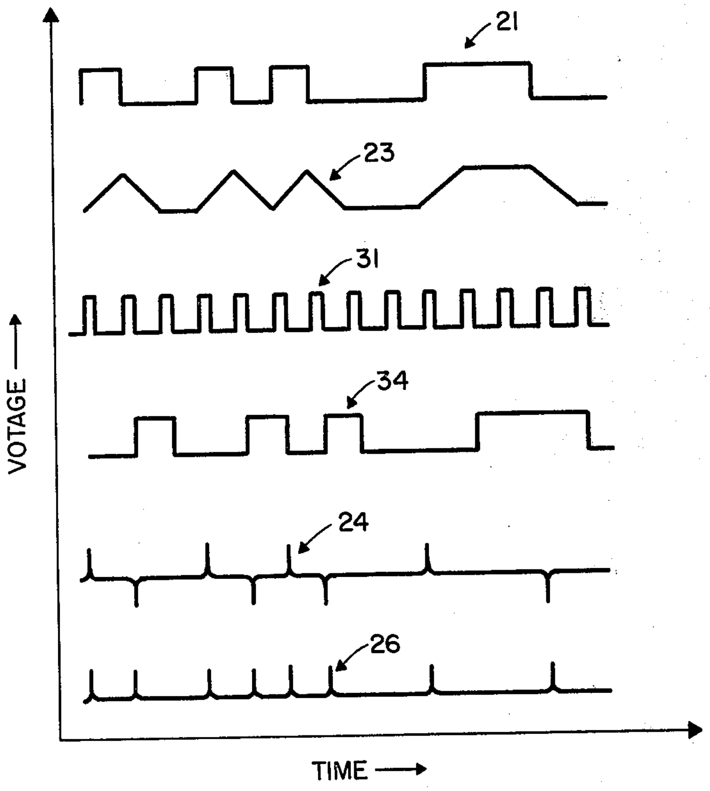
FIG. 2 is a set of wave shapes plotted as a function of time and which occur at various points of the block diagram of FIG. 1.

Referring now to the drawings and particularly to FIGS. 1 and 2, there is illustrated in FIG. 1 a block diagram of a digital bit synchronizer which includes the sample, decision and hold circuit of the present invention. The data input is received on a lead 10 and may consist of nonreturn to zero data (NRZ). This is a mode of recording which makes it unnecessary for the signal to return to zero after each bit has been recorded. Thus the pulse amplitude may remain at whatever its level was unless the next bit is a different digit. The input data impressed on lead 10 may either be obtained directly in a digital form or it may be a demodulated signal received on a carrier wave. The carrier wave, for example, may be a phase modulated wave such as the well known quadriphase shift keying wherein the carrier phase is shifted in steps of 90°.

The received data is impressed on an amplifier 11 and then on a matched filter 12. A matched filter is used for minimizing noise during signal detection and is designed to maximize the ratio of peak signal voltage to RMS noise. The filtered output is obtained on output lead 14 and contains the digital data. This may be further amplified by another amplifier 15 and then passed through the sample, decision and hold circuit 16 embodying the present invention. Its purpose is to sample and reconstruct the received data. The output of the decision and hold circuit 16 may be amplified by another amplifer 17 and the data may be obtained on lead 18. This data is again NRZ data. The portion of the bit synchronizer above the dotted line 19 serves the purpose to reconstruct the received data. As shown in FIG. 2, the graph 21 shows by way of example the NRZ data or pulse wave obtained on input lead 10. This data corresponds as shown to 10010100011 1. This is made with the assumption that a high amplitude represents digital 1 and a low amplitude represents digital zero. The output of amplifier 15 has a wave shape shown at 23 and this is the filtered output of the matched filter 12. Thus instead of rectangular pulses each pulse has an extended rise and fall time due to the characteristic of a matched filter output.

The unfiltered output of the matched filter 12 is obtained on lead 20. This unfiltered output is the same as that shown by waveshape 21. The NRZ data is now passed through a differentiator 22 the output of which is shown by the graph 24 in FIG. 2. As shown there a positive or negative spike is generated in response to the leading or trailing edge of each of the pulses shown by wave shape 21. These pulses are subsequently rectified by a full wave rectifier 25 so that its output is as shown by graph 26. Accordingly, there is now a positive-growing spike for each rising or trailing edge of the input data 21.

This wave is then passed through a bandpass filter 27 to select the clock fundamental component and through a phase-locked loop 28 to provide a local clock to the data reconstruction section and equipment external to the bit synchronizer. The output obtained on output lead 30 represents the clock signal which has been recovered from the received data. Thus the clock is recovered from the circuit below the dotted line 19. This clock signal is shown by the graph 31 in FIG. 2 as a series of narrow pulses. It should be noted, however, that the actual clock signal is a sine wave which for convenience has shown as a series of narrow pulses in FIG. 2. The clock pulse is now passed through a phase adjust circuit 32 which permits to adjust the phase of the clock pulse with respect to the filtered data. This is necessary to establish optimum sample timing, i.e., time of maximum signal to noise ratio at the Goto pair.

The clock pulse 31 of FIG. 2 is then impressed on the sample, decision and hold circuit 16 for the purpose of strobing each data pulse by the narrow clock pulse. This has the purpose to make a decision of the value of the digital signal and represents the best estimate of the binary state of the digital signal. Finally, the sampled and reconstructed data obtained from output lead 18 is in the form shown by graph 34 which, of course, should correspond to the original graph 21 although shifted in time due to the time delay of circuits 12 and 16.

It will be understood that the digital bit synchronizer of FIG. 1 is generally old and conventional and has only been illustrated and explained herein to provide a background for the present invention. Thus, the sample, decision and hold circuit 16 of FIG. 1 is illustrated in detail in FIG. 3 to which reference is now made. The NRZ data is obtained from input lead 36 and a resistor 37. The signal source is schematically illustrated at 38 having one terminal grounded while its other terminal is coupled to the input lead 36 through a resistor 40. Thus, the signal source 38 in resistor 40 represents the input load.

Two tunnel diodes 42 and 43 are connected to the output of a resistor 37 at a junction point 44.

The two tunnel diodes 42 and 43 are connected and biased to form a Goto pair. A tunnel diode is a heavily doped junction diode which is characterized by having a negative resistance in the forward direction over a portion of its operating range. This is due to quantum mechanical tunneling which explains the name.

Thus, as will be explained the cathode of tunnel diode 42 is connected to the anode of tunnel diode 43 to form a junction point 44. The anode of tunnel diode 42 biased positively and the cathode of tunnel diode 43 is biased negatively in such a manner that the two tunnel diodes are balanced. They provide a monostable circuit, that is a circuit having a single stable point. Thus, by the terminal 45 a 12 volt direct voltage is applied through a bleeder network consisting of resistors 46 and 47, the latter being grounded. By a variable tap 48 on the resistor 47 a positive voltage may be applied to the anode of tunnel diode 42 through resistor 50. A bypass capacitor 51 is connected between the tap 48 and ground to serve as a filter. The tap 48 controls the amount of positive voltage applied to the tunnel diode 42.

A similar network is used to apply a negative voltage to the cathode of tunnel diode 43 and corresponding elements are designated by the same reference numbers primed. Thus a negative direct current voltage of 12 volts is applied to the terminal 45' to maintain the tunnel diode 43 properly biased negatively.

The clock signal is obtained from lead 53 as previously explained and may be applied through a transformer 54 having a secondary winding which is center tapped to ground. Accordingly, the clock signal appears with a positive or negative polarity on the output leads 55 and 56 respectively. The positive clock is applied through resistor 57 directly to the anode of tunnel diode 42. Similarly, the negative clock is applied from lead 56 through resistor 58 to the cathode of tunnel diode 43.

As will be explained in more detail hereinafter, the two tunnel diodes 42 and 43 are so biased that one of them must switch state when the data pulse and clock exceed a critical value. Thereby the Goto pair is forced to make a decision whether the data was a binary 1 or zero. This data is now coupled through a back diode 60 to a memory circuit generally indicated at 61. The back diode 60 has its cathode connected to junction point 44 while its anode is connected to junction point 62.

A back diode also makes use of the quantum mechanical tunneling effect. Therefore, it attains a very low forward voltage drop corresponding to a high conductance and eliminates charge storage effects.

Another tunnnel diode 63 forms an essential part of the memory circuit 61 and has its anode connected to junction point 62 while its cathode is grounded. The tunnel diode 63 is biased by another bias network. Thus on terminal 64 a positive 12 volt direct current voltage is applied through resistors 65, 66 and 67. The junction point between resistors 65 and 66 is bypassed to ground by a capacitor 68 which operates as a filter capacitor.

The NRZ input on lead 36 is changed to an RZ form by the Goto pair 42, 43, that is a return to zero form of data recording and this appears at the junction point 44. The operation of the memory circuit 61 with the tunnel diode 63 is to change the RZ signal back into an NRZ signal. It should also be noted that the tunnel diode 63 has such a load line that it is a bistable circuit, that is a circuit stable in two different operating points.

The NRZ signal obtained at junction point 62 may be passed through a resistor 70 and appears at the output lead 71 which looks into a resistive load as shown at 72.

The operation of the circuit to FIG. 3 will now be explained by reference to the graphs of FIGS. 4 – 7.

Figure 4:
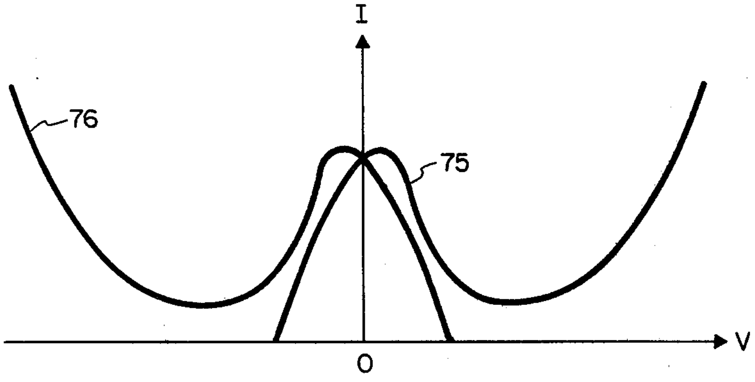
FIG. 4 is a graph plotting current as a function of voltage of a Goto pair of diodes forming part of the circuit of FIG. 3.

FIG. 4 illustrates the current-voltage response curve of the Goto pair 42–43, that is of two matched tunnel diodes. Thus curve 75 corresponds to diode 43 and curve 76 depicts the response of diode 42. The diode 43 is negatively biased while the diode 42 is positively biased. Both diodes are biased just below their peak current point so that one of the pair can be driven into the injection region whenever both a clock pulse and a data pulse are present. As explained before, this will force one of the two diodes 42 and 43 to change state and hence make a decision whether the received pulse represents a binary one or zero.

Figure 7:
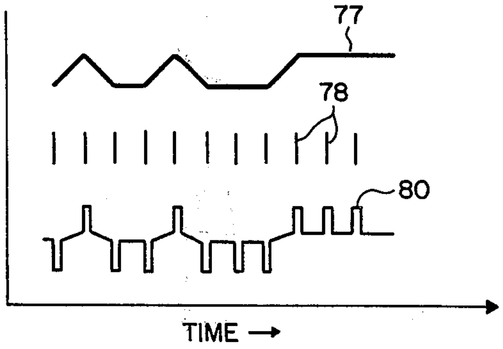
FIG. 7 is a set of wave shapes plotted as a function of time to illustrate waves including data input clock pulses and output voltages of the matched pair of tunnel diodes of the circuit of FIG. 3.

The result of the change is illustrated in FIG. 7. Here curve 77 represents another example of an NRZ data input. The input wave is shown as an output from an ideal matched filter. The data input is now strobed or sampled by each of the clock pulses 78. The sampling of the wave 77 by the clock pulses 78 is done so as to obtain the optimum result, that is each input pulse 77 is sampled at its peak amplitude. The result is a waveshape as shown at 80 in FIG. 7. This is a bipolar wave in the form of return to zero recording. This will now be explained in more detail.

Figure 3:
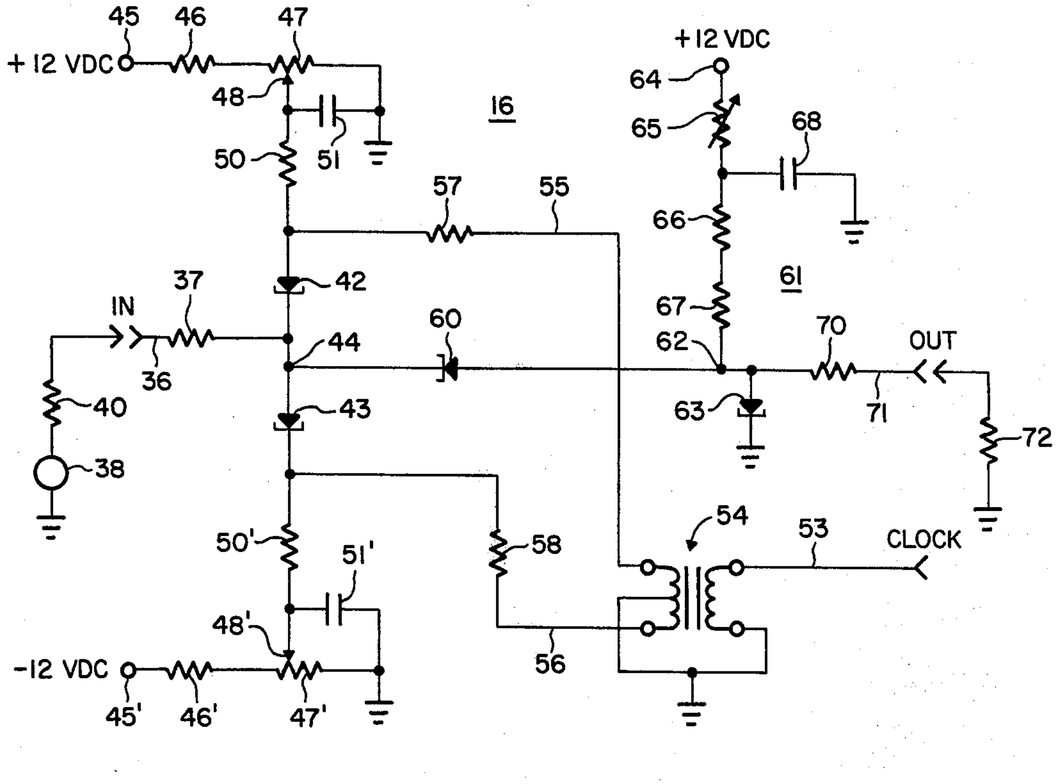
FIG. 3 is a circuit diagram of a preferred embodiment of the high speed sample, decision and hold circuit of the present invention.
Figure 5:
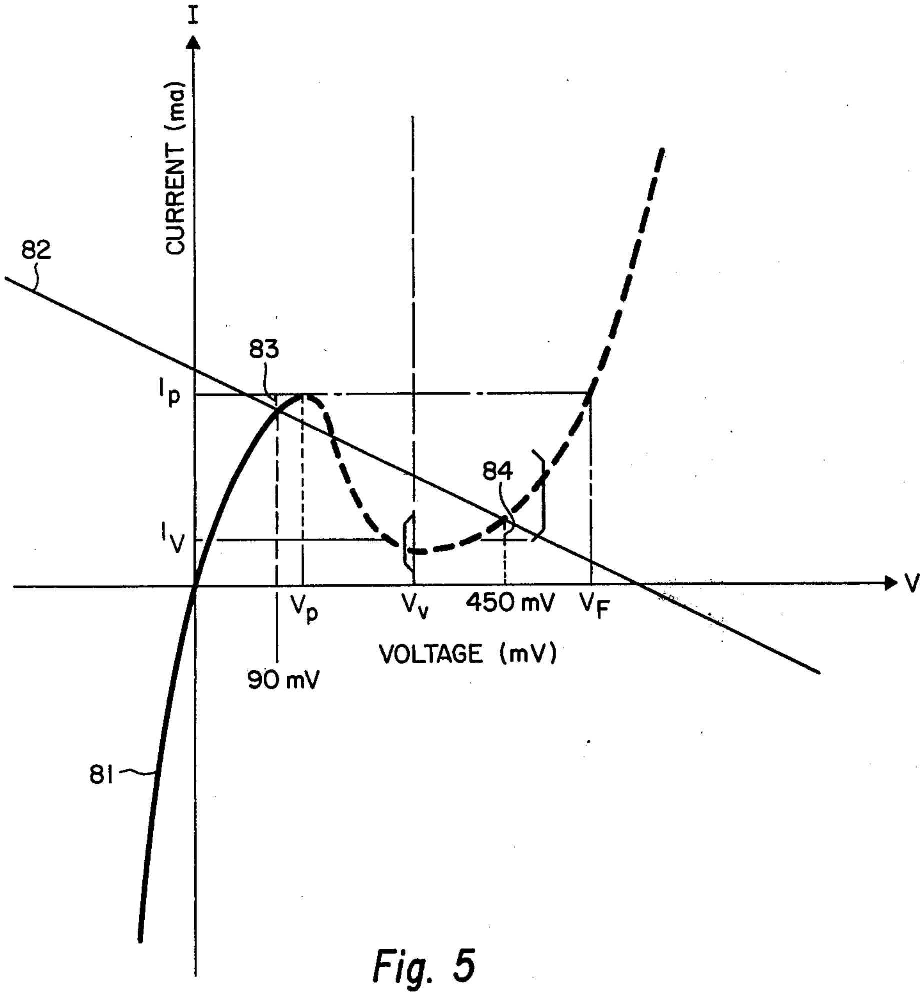
FIG. 5 is a graph of current plotted as a function of voltage for a tunnel diode with a bistable load line to explain the operation of the memory circuit forming part of the circuit of FIG. 3.
Figure 6:
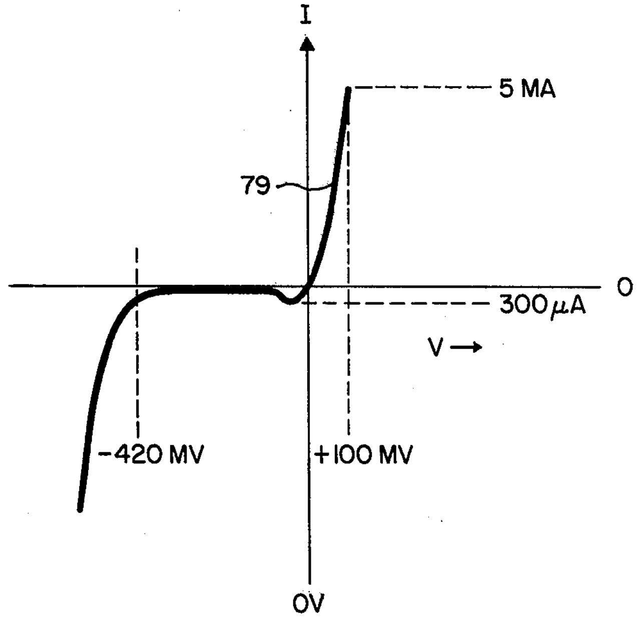
FIG. 6 is a graph of a waveform of current plotted as a function of voltage of a back diode to further explain the operation of the circuit of FIG. 3 and its coupling element.

The junction point 44 of FIG. 3 is coupled through the back diode 60 to the memory circuit 61. The characteristic of the back diode 60 is illustrated in FIG. 6 by curve 79. It should also be noted that the tunnel diode 63 has a bistable characteristic as illustrated in FIG. 5 which will be subsequently explained. Here the wave 81 of FIG. 5 illustrates the voltagecurrent characteristic of the tunnel diode 63 while 82 is the load line showing a bistable condition. The diode is biased at the stable point 83 where the load line 82 and characteristic intersect, the second intersection point being at 84. The tunnel diode 63 forms the essential part of the memory circuit and is used to convert the bipolar RZ decisions into the original NRZ form. As shown in FIG. 5, the stable point 83 corresponds to a bias voltage of approximately 90 millivolts (mv). Its high state corresponds to approximately 450 mv. The injection region is approximately between the points $V_V$ and $V_F$.

Assuming now that a positive input is applied to the junction point 44, clock strobing will cause diode 43 to be driven into the injection region. In this case the back diode 60 will also conduct, assuming that the tunnel diode 63 is in its low state. Therefore, if the data is a binary one the bistable tunnel diode 63 is driven into its high state corresponding to the point 84 in FIG. 5. It will remain in this state as long as there are subsequent positive pulses corresponding to binary ones. Thus the back diode 60 conducts when the junction point 44 exceeds +90 mv provided diode 63 is in its low state.

Assuming now that the bistable tunnel diode 63 is high and the next decision is low, the back diode 60 conducts. This is due to the fact that the junction 44 is approximately −300 mv at decision time which corresponds to a 750 mv difference between junction point 44 and junction point 62. Reference to FIG. 6 will show that diode 60 will conduct and force the memory to the low state.

Back diode 60 therefore serves the purpose of disconnecting the memory from the Goto pair except during memory transition. Close examination of FIG. 6 reveals that the back diode is not a perfect open circuit during nondecision time; however, the back diode quiescent current is negligible in practice.

Thus is will be seen that the Goto pair 42, 43 in conjunction with the memory circuit 61 functions as a combined sampling gate and decision circuit. The resulting decisions are stored by the memory circuit in the NRZ format. This is, of course, a normalized NRZ output.

It will be understood that the circuit specifications of the decision and hold circuit of FIG. 3 may vary according to the design for any particular application. The following circuit specifications are included by way of example only as suitable for data rates of 400 megabits per second.

| | |
|---|---|
| Resistor 37 | 10 ohms |
| Resistor 46 | 1 k ohms |
| Resistor 47 | 500 ohms |
| Resistor 50 | 24 ohms |
| Resistor 57 | 100 ohms |
| Resistor 65 | 500 ohms (variable) |
| Resistor 66 | 510 ohms |
| Resistor 67 | 510 ohms |
| Resistor 70 | 10 ohms |
| Resistor 72 | 50 ohms |
| Diodes 41 & 42 | SMTD 984 (matched pair) |
| Back diode 60 | BD 403 (General Electric) |
| Tunnel Diode 63 | TD-253 (10 milliamperes - General Electric) |
| Transformer 54 | Type 50 200 E |

Figure 8:
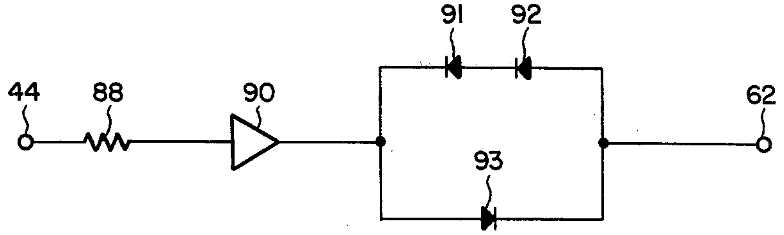
FIG. 8 is a circuit diagram of a modification of a portion of the circuit of FIG. 3.

The circuit of FIG. 3 was initially operated with a back diode 60 type BD-2 obtainable from General Electric. However it was found that this diode has a relatively large shunt capacitance of a maximum of 10 picofarad or 6.8 picofarad at a reverse voltage of 0.35. Accordingly the circuit was inoperable at very high data rates. In order to overcome this problem the circuit of FIG. 8 was used. This circuit represents a replacement of back diode 60 between junction points 44 and 62. It includes a resistor 88 followed by an amplifier 90 and a pair of diodes 91 and 92 having their cathodes connected serially between amplifiers 90 and junction point 62. Another diode 93 has its anode connected to amplifier 90 and is connected in parallel to the two diodes 91 and 92. Thus the three diodes 91 – 93 form a conductive loop. This circuit, however, limits the data rate. The circuit was actually used at 400 megabits per second. It is, however, believed that higher data rates on the order of 1 gigabit per second are obtainable with the circuit of FIG. 3 and a back diode with very low shunt capacitance. The diodes 91 – 93 are hot carrier diodes with a peak shunt capacitance of 1 picofarad. Since they require a relatively high forward voltage the amplifier 90 is required.

Figure 9:
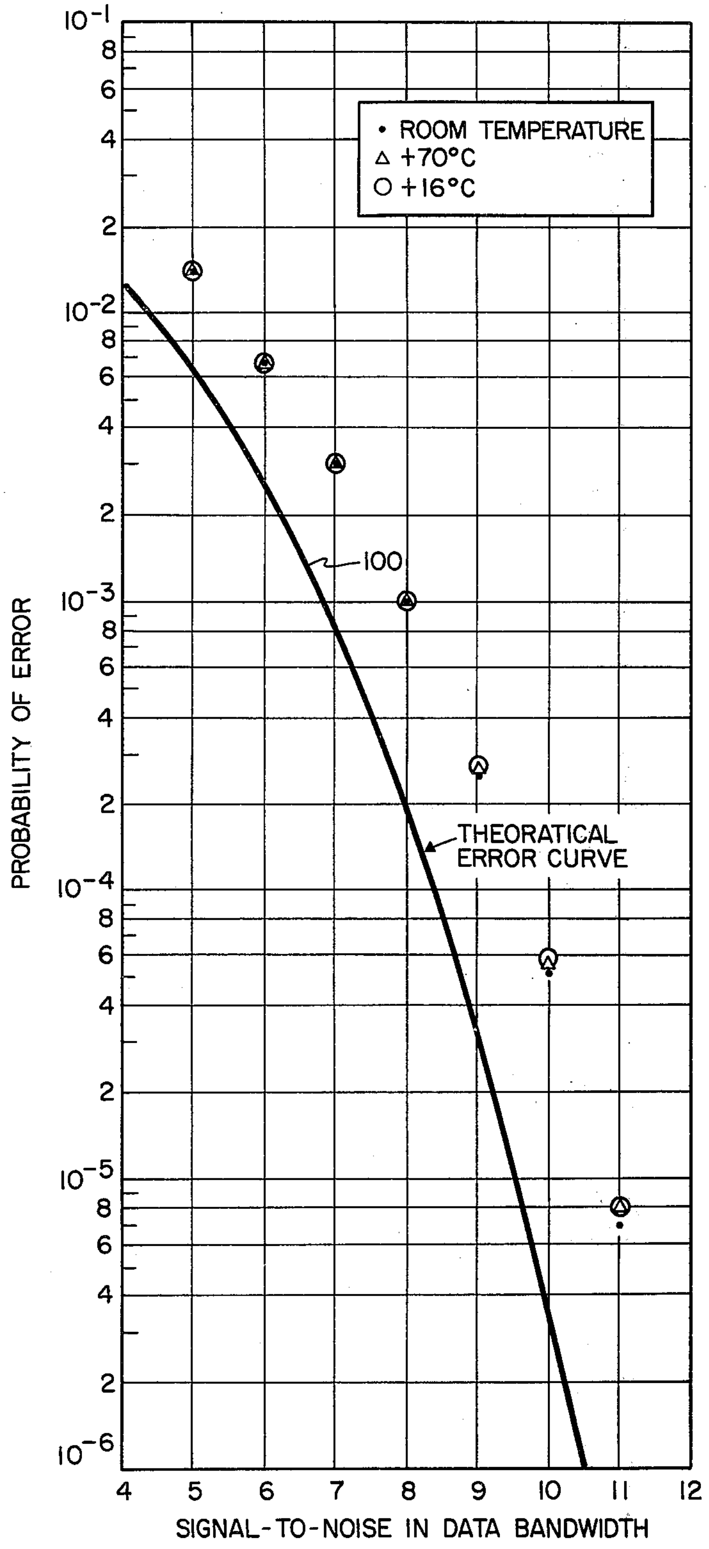
FIGS. 9 and 10 are graphs showing the probability of error as a function of the signal to noise in data bandwidths measured with the circuits of FIGS. 3 and 8.

Referring now to FIG. 9, this shows a theoretical error curve 100 where the probability of error is plotted as a function of signal to noise in data bandwidth. There are also measured points at room temperature, at +70° centrigrade (C) and at +16° C. These data were obtained with the circuit of FIG. 3. This shows a probability of error slightly higher than the theoretical one. Nevertheless, say for a signal to noise of 8, the measured probability of error is 1 part in 1,000. It will also be noted that the values taken at room temperature and at +16° and +70° C are almost in coincidence.

Figure 10:
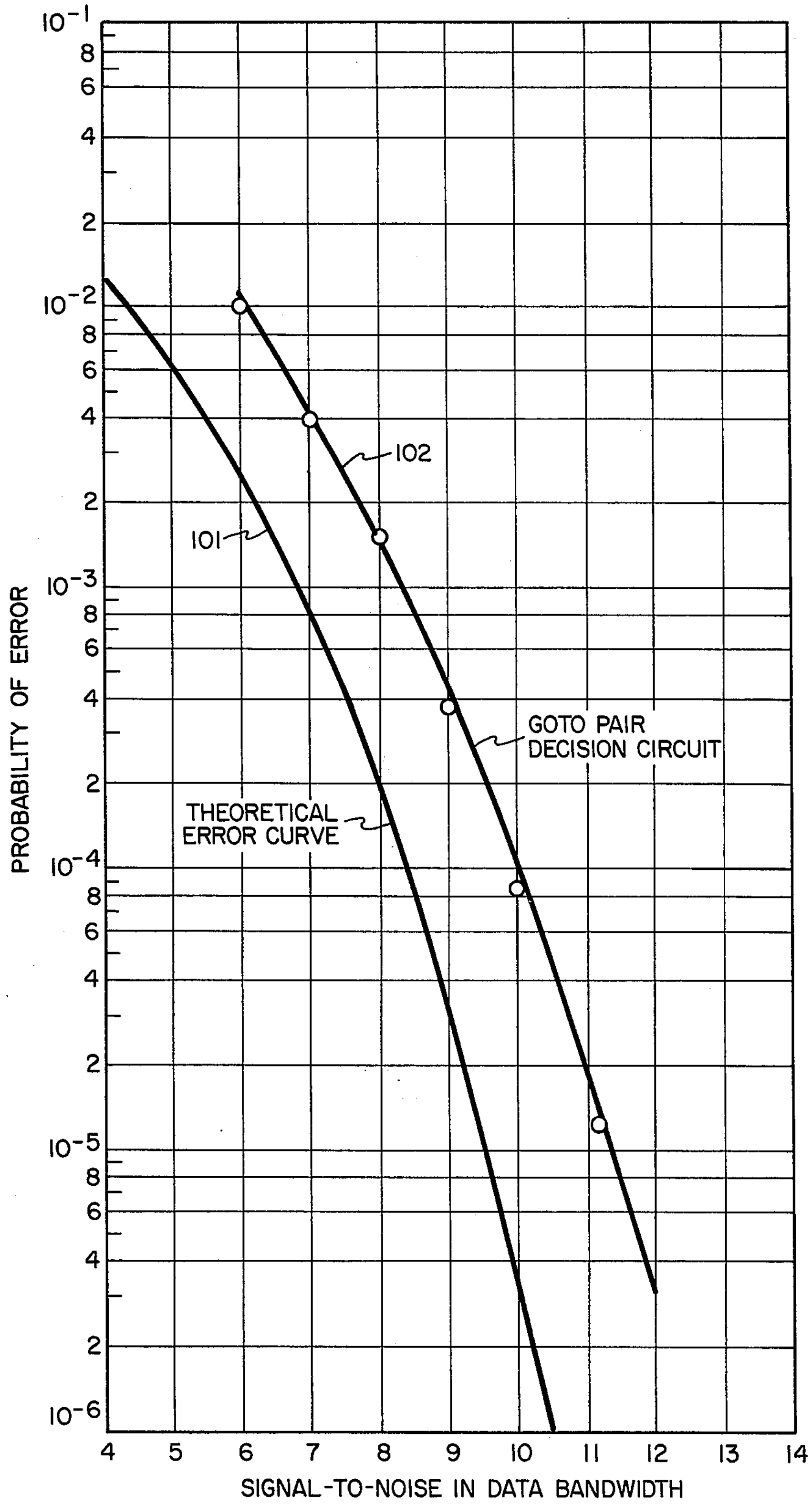

Referring now to FIG. 10, there is shown a similar theoretical error curve 101 and a measured error curve 102, both being plotted similar to the chart of FIG. 9. The measured values were obtained from the Goto pair 42 and 43 but with the circuit modification of FIG. 8. Again it will be noted that the measured error rate is higher than in FIG. 9. This is explained in part by the fact that the data bit rate of FIG. 10 is significantly higher. The degradation includes not only the contributions of the sample, decision and hold circuit 16, but also those attributable to the clock recovery and the matched filter 12. On the other hand the data rate obtainable was 400 megabits per second and it is believed that with the circuit of FIG. 3 even higher data rates on the order of 1 gigabit per second are obtainable.

There has thus been disclosed a high speed sample, decision and hold circuit for reconstructing NRZ digital data. The circuit is characterized by its high speed and by the fact that it requires a minimum of parts. It consists basically of a sample and decision circuit comprised of a Goto pair followed by a memory circuit. The memory circuit includes a bistable tunnel diode. The two circuits are coupled by a coupling element such as a back diode or similar elements. Finally, this circuit, utilizing a minimum of parts with relatively low primary power consumption provides low level, very high speed, sample and bipolar threshold detection or decision with storage or memory capability.

What is claimed is:

1. A high speed sample, decision and hold circuit for sampling and reconstructing a nonreturn to zero digital data input, said circuit comprising:

a. a first and a second tunnel diode, the cathode of said first diode being directly connected to the anode of said second diode to form junction point;

b. means for applying the nonreturn to zero data to said junction point;

c. means coupled to said first and said second diode for biasing and balancing said diodes to form a Goto pair;

d. means for applying a clock signal of opposite polarity to said first and second diodes so that each diode is supplied with a clock signal of a predetermined polarity, whereby the data in conjunction with the clock signal will drive a selected one of said diodes into its injection region;

e. a memory circuit including a third tunnel diode;

f. means for biasing said third diode so that it is in a bistable condition; and g. coupling means for coupling said first junction point to said third tunnel diode and for applying the voltage at said first junction point to said third diode to drive it from one stable state to the other or for maintaining it in its previous stable state depending upon the decision made by said first and second diodes.

2. A circuit as defined in claim 1 wherein said coupling means consists of a back diode.

3. A circuit as defined in claim 1 wherein said coupling means consists of an amplifier followed by at least two further diodes connected in parallel to form a conductive loop.

4. A circuit as defined in claim 3 wherein said further diodes are hot carrier diodes.

5. A high speed sample, decision and hold circuit for sampling and reconstructing a nonreturn to zero digital data input, said circuit comprising:

a. a first and a second tunnel diode, the cathode of said first diode being directly connected to the anode of said second diode to form a junction point;

b. means for supplying the nonreturn to zero data to said first junction point;

c. means for applying a clock signal of opposite polarity respectively to the anode of said first diode and the cathode of said second diode;

d. means connected to the anode of said first diode and the cathode of said second diode for biasing and balancing said diodes to form a Goto pair and so that the data in conjunction with the clock signal will force a selected one of said diodes into the injection region;

e. a memory circuit including a third tunnel diode;

f. means connected to said third diode for biasing it to be in a bistable state; and g. coupling means for coupling said junction point to said third diode and including a unilaterally conducting device for driving said third diode into one of its stable states in response to the voltage at said first junction point.

6. A circuit as defined in claim 5 wherein said coupling means consists of a back diode having its cathode connected to said junction point.

7. A circuit as defined in claim 5 wherein said coupling means consists of an amplifier and at least two further diodes connected in parallel to form a conductive loop connected to said third tunnel diode.

8. A circuit as defined in claim 7 wherein said further diodes are hot carrier diodes.

9. A circuit as defined in claim 5 wherein said clock signals of opposite polarity are applied to the anode of said first diode and the cathode of said second diode by a respective resistor.

10. A circuit as defined in claim 5 wherein said first and second diodes are so biased that one of them will be triggered by the combination of the data and the clock signal whereupon the triggered diode will subsequently return to its low point.

* * * * *